(12) United States Patent
Fricke et al.

(10) Patent No.: US 7,522,923 B2
(45) Date of Patent: Apr. 21, 2009

(54) METHOD, SYSTEMS AND COMPUTER PROGRAM PRODUCTS FOR DATA LOGGING

(75) Inventors: Volker Fricke, Altdorf (DE); Gary Paul Noble, Worcestershire (GB); Wendy Ann Trice, Hampshire (GB)

(73) Assignee: International Business Machiens Corporation, Armonk, NY (US)

( * ) Notice: Subject to any disclaimer, the term of this patent is extended or adjusted under 35 U.S.C. 154(b) by 178 days.

(21) Appl. No.: 10/552,694

(22) PCT Filed: Apr. 2, 2004

(86) PCT No.: PCT/GB2004/001448

§ 371 (c)(1),
(2), (4) Date: Oct. 6, 2006

(87) PCT Pub. No.: WO2004/091149

PCT Pub. Date: Oct. 21, 2004

(65) Prior Publication Data

US 2007/0064633 A1 Mar. 22, 2007

(30) Foreign Application Priority Data

Apr. 9, 2003 (GB) .................... 0308137.9

(51) Int. Cl.
*H04Q 7/20* (2006.01)
*H04Q 7/00* (2006.01)
*H04B 7/00* (2006.01)

(52) U.S. Cl. .................... 455/452.2; 455/453; 455/512; 370/310

(58) Field of Classification Search .............. 455/452.2, 455/453, 512, 412.1
See application file for complete search history.

(56) References Cited

U.S. PATENT DOCUMENTS

| 6,493,331 | B1 | 12/2002 | Walton et al. |
| 6,539,231 | B1 | 3/2003 | Rodgers et al. |
| 6,925,057 | B2 * | 8/2005 | Cheng et al. ................. 370/235 |
| 6,985,439 | B2 * | 1/2006 | Hosein ....................... 370/230 |
| 2001/0012760 | A1 | 8/2001 | Avis |
| 2002/0094815 | A1 | 7/2002 | Kanerva |
| 2004/0203968 | A1 * | 10/2004 | Gopalakrishnan et al. ... 455/512 |
| 2004/0248583 | A1 * | 12/2004 | Satt et al. ................. 455/452.2 |

FOREIGN PATENT DOCUMENTS

| TW | 512602 B | 12/2002 |
| WO | WO 01/31945 | 5/2001 |

OTHER PUBLICATIONS

International Search Report corresponding to PCT/GB2004/001448, mailed Nov. 30, 2004.

* cited by examiner

*Primary Examiner*—Nick Corsaro
*Assistant Examiner*—Tangela T. Chambers
(74) *Attorney, Agent, or Firm*—Dillon & Yudell, LLP

(57) ABSTRACT

Methods, systems and computer program products are provided for transferring log data to a server over a wireless network from a plurality of remote devices. The server is configured to receive data from the plurality of remote devices. A transfer period is scheduled for transferring log data from a remote device to the server taking into account a wireless network signal strength of the remote device for the scheduled transfer period. The scheduled transfer period does not overlap a time when an estimated wireless network strength is too low to transfer the log data.

7 Claims, 4 Drawing Sheets

Profile data 302

Connectivity Profile 103A

Device 100N
Device 100B

| Device 100A | | |
|---|---|---|
| Time | Signal Strength | Position |
| 324567 | 150 | 20x30y40z |
| 334790 | 100 | 22x30y42z |

Download profile 103B

Device 100N
Device 100B

| Device 100A | | |
|---|---|---|
| Download time | Size | |
| 324567 | 150 | |
| Future | 100 | |

Figure 2

Plan 306

| Scheduled Time2 | Device | Scheduled download size |
|---|---|---|
| 17:20-17:21 | 100A | 5k |
| 17:21-17:23 | 100B | 10k |
| 17:23-17:26 | 100C | 15k |

Figure 3

METHOD, SYSTEMS AND COMPUTER PROGRAM PRODUCTS FOR DATA LOGGING

RELATED APPLICATIONS

The present application is a 35 U.S.C. §371 national phase application of PCT International Application No. PCT/GB2004/001448, having an international filing date of Apr. 2, 2004, and claiming priority to European Patent Application No. 0308137.9, filed Apr. 9, 2003, the disclosures of which are incorporated herein by reference in their entireties. The above PCT International Application was published in the English language and has International Publication No. WO 2004/091149 A2.

FIELD OF THE INVENTION

This invention relates to a method and apparatus for data logging.

BACKGROUND OF THE INVENTION

Data logging in this specification is the process of collecting data from mobile devices performed in order to obtain business information relating to how the mobile devices operate. For example, position, location and speed of a vehicle over time is useful log data for use in insurance liability calculations for that vehicle. In another example, signal strength of a mobile communication system over both time and position is useful log data to enable a telecommunication company to plan its transmitter locations. Such data is collected by a mobile embedded system using positional information and signal strength information from sources including the network itself (e.g. GSM) and global positioning satellites (GPS). Log data is stored in the mobile embedded system for later transmission to the central system. Transmission is by mobile phone network or other wireless technology.

Transmission of the data log may be performed on demand, when the device is ready it requests control of the transmission channel. Such a system is described in U.S. Pat. No. 6,263,268 which discloses a mobile automotive telemetry system for installation on-board a vehicle. It includes a diagnostic structure for monitoring operational functions of a vehicle and a server which communicates with the diagnostic structure to receive operational information. The operational information is uploaded to the server when the information is ready.

Another download on demand system, International Patent Publication 02/03350, discloses a method and system for monitoring cellular communication. The method continuously extracts traffic load and speed on roads within the coverage area of a cellular network from a mobile device in a vehicle. The data is extracted directly from the higher level of communication in a cellular network so there is no scheduled or negotiated download of data from the mobile device.

One problem with downloading log data on demand is that it can lead to a conflict situation when several devices are requesting control of a single download channel and attempting to download at the same time. Only one request per channel will be successful at any one time and the other requests fail. The failed requests use download resource so that more resource is used for non-ordered requests than for ordered requests. One way to order the downloads is to schedule them to come in at a certain times.

US Patent publication 0028313 discloses a distributed telemetry method and system affected by co-ordinating the taking of readings of a parameter by mobile phone users, the parameter readings being sent to a service system together with location information on the users. It is the task of a query scheduler to, amongst other things, organise when the reading of interest are to be taken. The reading is sent to the service system immediately or triggered by, for example, a scheduled time.

The problem with scheduled remote data logging is that simultaneous and multiple device upload of data can create overload on a server that collects such log data when the bandwidth is different from that predicted.

SUMMARY OF THE INVENTION

According to a first aspect of the present invention there is provided a data logging method for transferring log data to a server over a wireless network from a plurality of remote devices, said server for receiving data from the plurality of said devices, said method comprising the following steps:

scheduling a transfer period for transferring log data from a device to the server taking into account the wireless network signal strength of the device for the scheduled transfer period whereby the scheduled transfer period does not overlap a time when the estimated wireless network strength is too low to transfer the log data; and transferring data determined by its respective transfer period in the schedule.

The scheduling step above advantageously comprises the following steps:

selecting a device from the plurality of devices;

providing a transfer size for data to be transferred from the selected device;

calculating, for the selected device, a transfer period including a start time and an end time to transfer the log data to the server, the calculation using the selected device's transfer size and using transfer periods of other devices if known;

estimating, for the selected device, wireless network signal strength data for the calculated transfer period;

performing, for the selected device, the calculating and estimating steps again if the transfer period overlaps a period of time where the estimated wireless network strength is below a predetermined threshold; and storing the transfer period in a schedule.

The method advantageously further comprising:

acquiring the actual transfer size for a device before transferring the data;

re-calculating the transfer period for the first device; and recalculating transfer periods of other devices if the re-calculated transfer period of the first device affects the transfer periods of the other devices.

Suitably, when calculating the transfer period, the server transfer capacity is taken into account.

More suitably, an estimate is made using historical server transfer capacity data from a similar time period.

Preferably, for a particular device, more than one transfer period is calculated so that the data may be downloaded. Such a device is one existing in variable signal strength conditions.

More preferably the device alerts the server to the actual transfer size when or before transfer takes place. If the actual transfer size is significantly different to the predicted transfer size then the server recalculates the schedule.

Advantageously, the server stores wireless network signal strength for each client with respect to time.

More advantageously, the server makes an estimate of future wireless network signal strength for a particular client based on the signal strength at a previous time, for instance, the same time of day a week before. If the signal strength is acceptable for all or most of the scheduled transfer then the server can assume a low chance of interruption. Conversely if there is an interruption in this previous transfer, the server can assume a high chance of interruption.

Suitably, the server stores wireless position data for each client with respect to time and makes an estimate of future wireless network signal strength by estimating future position based on the present position, direction of travel, and speed of travel.

More suitably the method further comprising:

acquiring the actual wireless network signal strength before transferring log data; and rescheduling the transfer period if actual wireless network strength is below a predetermined threshold.

Preferably, the method is performed on devised in a defined priority.

More preferably a device's priority is defined by its wireless network signal strength.

Advantageously a device's priority is defined by the quantity of data to transfer.

More advantageously, there is provided a reserve channel for service information. If a device finds that it has not been serviced but now has a need to transfer data. The device can proactively contact the server to request a higher priority of servicing. This request and data transfer needs to use an alternative channel of communication into the server and ensures that other lower priority tasks do not block its request.

Suitably, some devices do not have a scheduled download but download on demand. This allows for the benefits of an on-demand download as well as that from adaptive scheduling. Some devices may be deactivated, hence to not need to be included into the scheduling and planning system while in this state. They are treated as non-scheduled devices and data log download is on-demand and when available.

BRIEF DESCRIPTION OF THE DRAWINGS

In order to promote a fuller understanding of this and other aspects of the present invention, an embodiment of the invention will now be described, by means of example only, with reference to the accompanying drawings in which:

FIG. 2 is a schematic diagram of a profile data structure stored by the present embodiment of the invention;

FIG. 3 is a schematic diagram of a plan data structure stored by the present embodiment of the invention.

DETAILED DESCRIPTION OF THE EMBODIMENTS OF THE INVENTION

Figure 1:
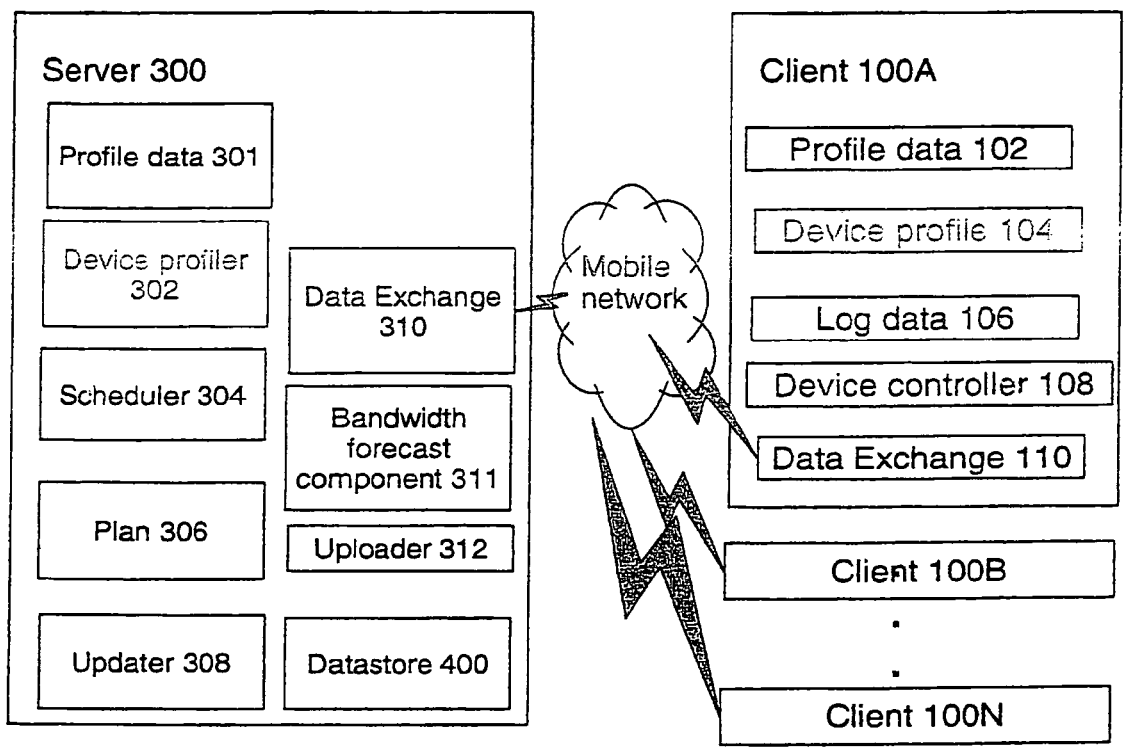
FIG. 1 is a schematic diagram of the present embodiment of the invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Referring to FIG. 1, a data logging system comprises: a server 300 connected over a mobile network to a plurality of remote client devices 100A . . . N. The first device is 100A, second device is 100B and so on up to 100N where N is of order a million devices. Each device 100A . . . N comprises: profile data 102; a device profiler 104; a data log 106; a device controller 108; and a data exchange 110. The server 300 comprises: profile data 301; a device profiler 302; a scheduler 304; a plan 306; an updater component 308; data exchange 310; a bandwidth forecast component 311; and an upload component 312. Log data is stored in a datastore 400.

Device profiler 302 maintains each device profile 102 collected from the client devices.

A device profile 102 includes characteristics relating to the device but not the download data itself. Referring to FIG. 2, device profile 102 comprises two profiles for each device in the preferred embodiment: firstly a connectivity profile 103A; and secondly a download profile 103B.

The connectively profile 103A includes GSM radio reception power over time and comprises a data structure having a date and time field and GSM signal field. In a further embodiment the geographical position of the device will be included in the connectivity profile where it is derived from global positioning system (GPS) data or trigonmetric data from the GSM receivers. The status of a device is recorded over a week as this is mostly likely to show a pattern. However, in other embodiments, a longer period may be used instead of or as well as. A day of data is normally regarded as the minimum, although theoretically it could be smaller, and three weeks of data gives better averages. More than four weeks of data puts pressure on the storage resource of the device profiler 302.

The quantity of data previously collected allows for at least an estimate to be made of the next quantity of data downloaded. The device profiler 302 provides information to the device scheduler 304 to enable it to establish an estimate for connection time. It also provides information relating to GSM power levels so that unsuitable connection times can be estimated.

The download profile 103B, stores, for each device, a record of each download of data and comprises the time of download and the quantity of data collected in the download.

The scheduler 304 builds the plan 306 by allocating time periods to each specific device based initially on the amount of data that each device is expected to transfer. Device scheduler 304 receives the actual network usage from the data exchange 310 and bandwidth forecast—information from component 311. If the scheduler 304 sees that current network usage exceeds or is much less than that used to build the plan 306 then the scheduler 304 updates the plan 306. The device scheduler 304 works to substantially 80% full capacity so that overruns can be catered for and rescheduling work does not continuously replan.

The plan 306 (see FIG. 3) is a data structure that stores a download schedule for each device. Each download for a device is a record in the database having four fields: 1) transfer period (start time and end time); 2) the device identification; and 3) the transfer size.

The updater component 308 keeps a device updated as to its scheduled time by passing messages with the current schedule details and also when relevant changes are made to the plan 306. It keeps track of a device that is off-line and informs the off-line device as soon as it becomes on-line through the data exchange 310.

The update component 308 negotiates with the scheduler 304 in case the device has run out of memory or has not downloaded for an excessive period of time. The scheduler 304 identifies change in the plan 306 and informs the updater component 308 and updates the plan 306 with confirmation from the devices 100A . . . N.

The bandwidth forecast component 311 monitors current download activity from actual data transfers going through the data exchange 310. From this information the present download bandwidth can be monitored and stored for future planning reference. This data is then used to provide a forecast of network capacity for the scheduler 304, which then in turn may choose to throttle back the data transfer by moving devices, or move devices up to take advantage of available bandwidth. In another embodiment the bandwidth component acquires forecast information from a network supplier.

The uploader 312 determines when to update client devices with new software. It takes as input plan 306 to provide an indication of other traffic that may make use of the data communications lines 210, 206. The plan 306 will have an impact on deciding when to upload software to the client devices as each download will reduce the 'effective' communications bandwidth for data upload.

The client device 100A will now be described in Client devices 100B . . . N have the same components and configuration but different identification. Each device 100A . . . N comprises: profile data 102; a device profiler 104; a data log 106; a device controller 108; and a data exchange 110.

The profile data 102, maintained by the device profile component 104, maintains a profile of the device's connectivity and data volumetrics. It is the profile data 102 that is sent to the server 300 to be used in planning and prioritization by the scheduler 304.

The data log 106 contains the log data for transfer to the server 300, it also may contain any specific data used by the device controller 108. The key objective is to transfer log data 106 from the client to the datastore 400 via the server 300.

Device controller 108 is responsible for ensuring co-ordination of the log data 106 and controls the download of data to the server 300 and the communication of data volumes. It is the device controller 108 that initiates the data connection and bulk transfer based on the scheduled time received from the server 300. The device controller 108 receives the schedule information from plan 306 via the update component 308. Before the downloading of the log data the device controller 108 establishes communication with the scheduler 304 through update component 308 and the data exchange mechanism 310/110 to check for final adjustments. Ideally each client 100A . . . N would be controlled by the same version of device controller 108 but it may be that some devices have been updated by uploader 312 and others are using an older version. Software updates can be transferred between the server 300 and the clients 100A . . . N along the same communication lines as the data is transferred.

Figure 4:
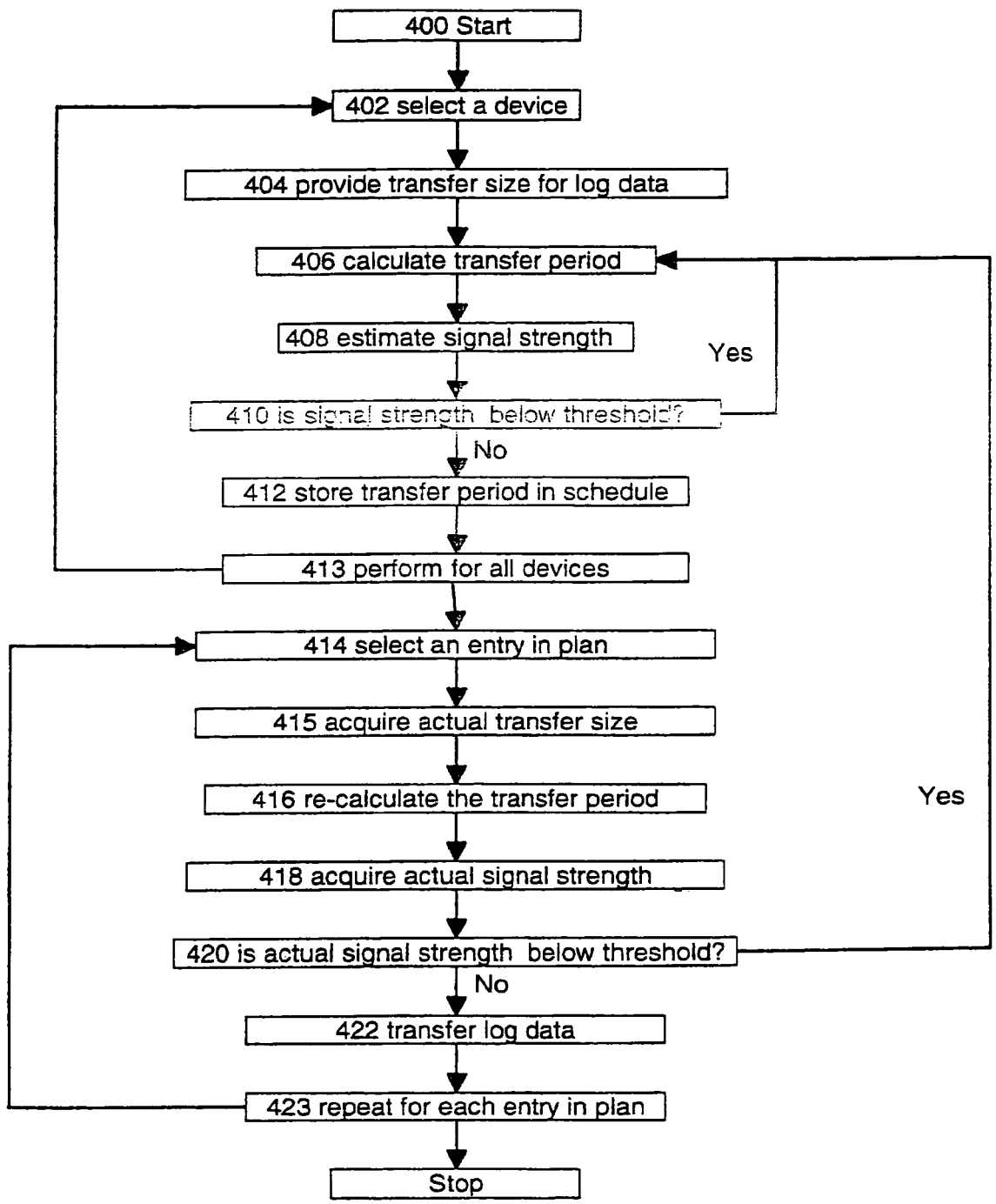
FIG. 4 is a flowchart illustrating operations according to some embodiments of the present invention.

Method 400 of the embodiment is described with respect to FIG. 4. The scheduler 304 selects, step 402, a first client device from the available devices in the profile data 301. Each device has previously contacted the server and registered itself as available in the profile data 301. Each device sends information relating to its expected future download size and this is stored in a download profile 103B. The device profiler 302 creates new profile data structures for each new registered device and stores the contact details of the device in the device profile. Any future download size is stored in the related download profile data structure.

The scheduler 304 acquires, step 404, the transfer size for log data from the download profiles.

The scheduler 304 calculates, step 406, the future transfer period of device based on the availability of the download bandwidth of the server 300 and the transfer size of the log data estimated in step 404. The calculation excludes certain periods that have been eliminated at step 410 due to a weak signal strength.

The scheduler 304 estimates, step 408, the signal strength by looking up the connectivity profile of the device. The simplest embodiment uses the signal strength of a week previous but another embodiment averages the signal strength from the last two or three weeks.

The scheduler 304 compares, step 410, the estimated signal with a threshold. If the estimated signal strength is below the threshold then the signal strength will be too low for reliable transmission of data and the method branches back to step 406 and a new transfer period will be calculated.

The scheduler 304 stores, step 412, the transfer period in the plan 306. At this point the updater 308 sends the transfer period to the device in question.

The scheduler 304 then performs, step 413, for each device 100A . . . N the steps 402 to 412 so that the plan 306 has a scheduled time and a scheduled download size for each device 100A . . . N.

The plan 306 selects, step 414, a device having an imminent transfer period.

The scheduler 304 acquires, step 415, an actual transfer size by communicating with the device controller 108 through data exchange 110/310. The device controller queries the log data 106 and returns the value.

The scheduler 304 recalculates, step 416, the transfer period at this later stage.

The scheduler 304 acquires, step 418, the actual signal strength before transmission.

The scheduler 304 checks, step 420 if the acquired signal strength is below a threshold. A typical threshold would be 20% of maximum power but this value would depend on the working conditions of the implementation. If the acquired signal strength is below 20% then the present transfer is aborted. A new transfer period is needed and the method goes back to step 406. If the acquired signal strength is 20% or above then the method proceeds to step 422.

Once the signal strength is confirmed then the log data is transferred, step 422, through the data exchange mechanism 310/110. In the preferred embodiment the device controller 108 initiates the communication and log data transfer at the scheduled time. In another embodiment the scheduler 304 initiates the download communication when it checks the signal strength.

The scheduler 304 then performs, step 423, for each entry in the plan 306 the steps 414 to 422 so that each device transfers its log data when the signal strength is acceptable.

Although the embodiments have been described in terms of a single server it is possible to scale the solution up to two or more servers.

Many alterations and modifications may be made by those having ordinary skill in the art, given the benefit of present disclosure, without departing from the spirit and scope of the invention. Therefore, it must be understood that the illustrated embodiments. have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

The invention claimed is:

1. A method for transferring log data to a server over a wireless network from a plurality of remote devices, said method comprising:

constructing a transfer plan for each of said remote devices by allocating a transfer period to each of said remote device according to the amount of data expected to be transferred to said server;

selecting an entry within said transfer plan for one of said remote devices having an imminent transfer period;

acquiring an actual transfer size for log data to be transferred from said selected one remote device;

determining, for said selected one remote device, a transfer period including a start time and an end time to transfer said log data to said server based on said actual transfer size;

acquiring, for said selected one remote device, an actual wireless network signal strength for said transfer period;

determining whether or not said actual wireless network signal strength is below a predetermined threshold;

in response to a determination that said actual wireless network signal strength is not below a predetermined threshold, transferring said log data from said selected one remote device to said server; and in response to a determination that said actual wireless network signal strength is below said predetermined threshold, aborting said transfer of log data from said selected one remote device to said server.

2. The method of claim 1, wherein said aborting further includes determining a new transfer period for said selected one remote device; and updating said selected entry within said transfer plan for said selected one remote device with said new transfer period.

3. The method of claim 1, wherein said constructing further includes selecting one of said remote devices;

acquiring an estimated transfer size for log data to be transferred from said selected remote device;

determining, for said selected remote device, a transfer period for transferring log data to said server based on said estimated transfer size and availability of download bandwidth of said server;

estimating, for said selected remote device, wireless network signal strength during said determined transfer period; and storing said determined transfer period in said transfer plan if said estimated wireless network signal strength is not below a predetermined threshold.

4. The method of claim 3, wherein said storing further includes determining, for said selected remote device, a new transfer period for transferring log data to said server based on said estimated transfer size and availability of download bandwidth of said server if said estimated wireless network signal strength is below said predetermined threshold.

5. The method of claim 3, wherein said acquiring further includes acquiring said estimated transfer size for log data to be transferred from a profile data stored within said selected remote device.

6. The method of claim 5, wherein said profile data includes a connectivity profile and a download profile.

7. The method of claim 1, wherein said method further includes updating said transfer plan based on actual network usage and bandwidth forecast information.

* * * * *